April 1, 1958 R. E. SMUCKER ET AL 2,828,509
PLASTIC MOLDING MACHINES
Filed Nov. 3, 1954 4 Sheets-Sheet 1

Inventors
James M. Harrison
Robert E. Smucker
by Parker & Carter
Attorneys

Inventors
James M. Harrison
Robert E. Smucker
by Parker & Carter
Attorneys

April 1, 1958 R. E. SMUCKER ET AL 2,828,509
PLASTIC MOLDING MACHINES
Filed Nov. 3, 1954 4 Sheets-Sheet 4

Inventors
James M. Harrison
Robert E. Smucker
by Parker & Carter
Attorneys

United States Patent Office 2,828,509
Patented Apr. 1, 1958

2,828,509

PLASTIC MOLDING MACHINES

Robert E. Smucker and James M. Harrison, Fort Worth, Tex., assignors to Crown Machine and Tool Company, Fort Worth, Tex., a corporation of Texas Application November 3, 1954, Serial No. 466,482

5 Claims. (Cl. 18—30)

This invention is in the field of plastic molding machines and equipment for the injection molding of what can be considered relatively thin-walled articles, although it is not necessarily limited in this respect.

A primary object of our invention is a new and improved plastic molding machine constructed so that the finished article does not have any gates, sprues or runners which must be trimmed off.

Another object is a molding machine of the above type which forms no sprues and therefore saves the plastic material that might be lost through their removal.

Another object is a molding machine of the above type in which all the plastic is retained in the injection system except that required to fill the molding cavity.

Another object is a molding machine of the above type constructed so that it requires substantially reduced injection pressures over those normally required for such a unit.

Another object is a molding machine in which substantially all of the resistance to plastic flow from the injection cylinder to the cavity is eliminated.

Another object is a nozzle structure movably insertable into the cavity platen of a molding mechanism with a pilot action between the nozzle and platen to insure proper alignment at the contact area on the tip of the nozzle.

Another object is a plastic molding structure arranged so that the injection passage leading to the molding cavity is shortened by four or five inches.

Another object is a molding mechanism in which automatic degating is accomplished when the movable platen is backed away from the nozzle.

Another object is a molding structure in which the blunt tip or end of the nozzle is a physical part of the closed molding cavity.

Another object is an air valve in the core to break any vacuum between the molded article and the core.

Another object is a molding structure of the above type with a water coursing in the air valve to prevent a hot spot in the end of the core.

Another object is a molding structure of the above type in which the injection nozzle is in heat transfer relationship with the cavity platen over a critical area at the tip.

Another object is a molding mechanism of the preceding type with a molding cavity which is constructed and cooled in such a manner that the nozzle will not pull the bottom out of the molded article when they are separated.

Another object is a method of operating a molding structure of the above type so that the plastic material in the end of the nozzle passage will solidify after each injection stroke but will be liquified just prior to each injection stroke.

Other objects will appear from time to time in the ensuing specifications and drawings in which.

Figure 1:
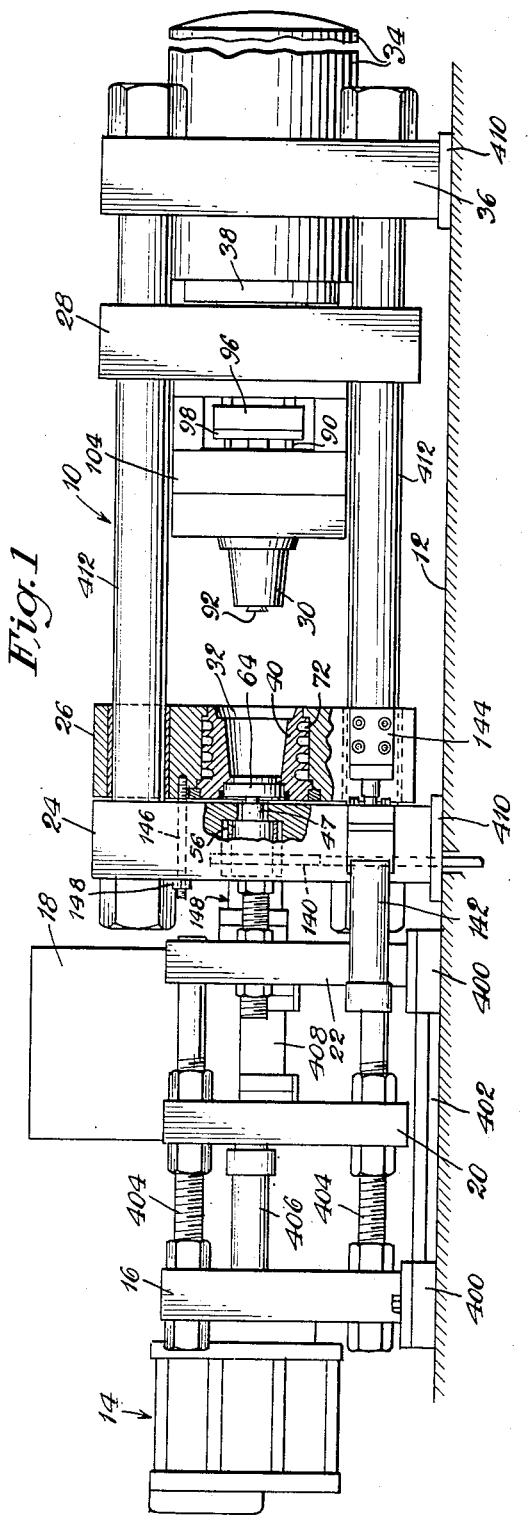
Figure 1 is a side view, partly in section, of our new and improved molding mechanism.

In Figure 1 we have indicated our molding mechanism at 10 as generally mounted on any suitable base 12. We have only diagrammatically shown the overall unit as the majority of the details are conventional and well known. For example, a suitable injection cylinder is indicated at 14 mounted on the usual supporting platen 16. The usual preplasticizing chamber 18 is supported by rear and forward support platens 20 and 22. An anchor platen 24 cooperates with a cavity platen 26 to be explained in detail below, and also with a movable platen 28, which carries a core 30 opposed to a cavity 32 in the cavity platen. A clamp cylinder 34 is carried at the forward end of the machine on a supporting platen 36 with the usual clamp cylinder head 38.

The injection assembly has sliding ways 400 mounted on a guide rail structure 402 with its various platens being tied together by strain rods 404. The assembly has an injection ram 406 and injection cylinder housing 408. The clamp assembly has suitable base pads 410 and the platens are mounted on suitable strain rods 412.

Figure 2:
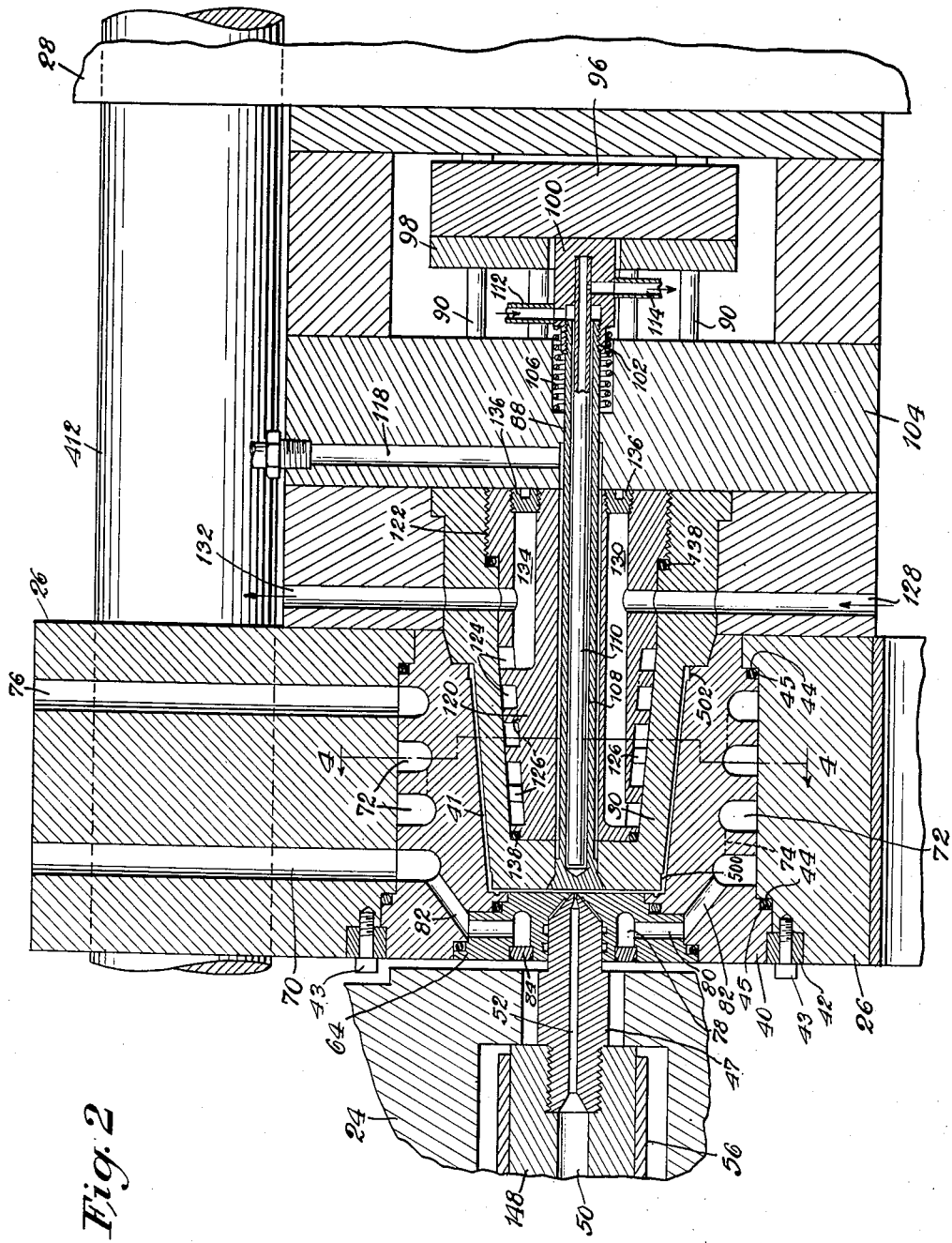
Figure 2 is a sectional view and an enlarged scale of the molding cavity in Figure 1.
Figure 3:
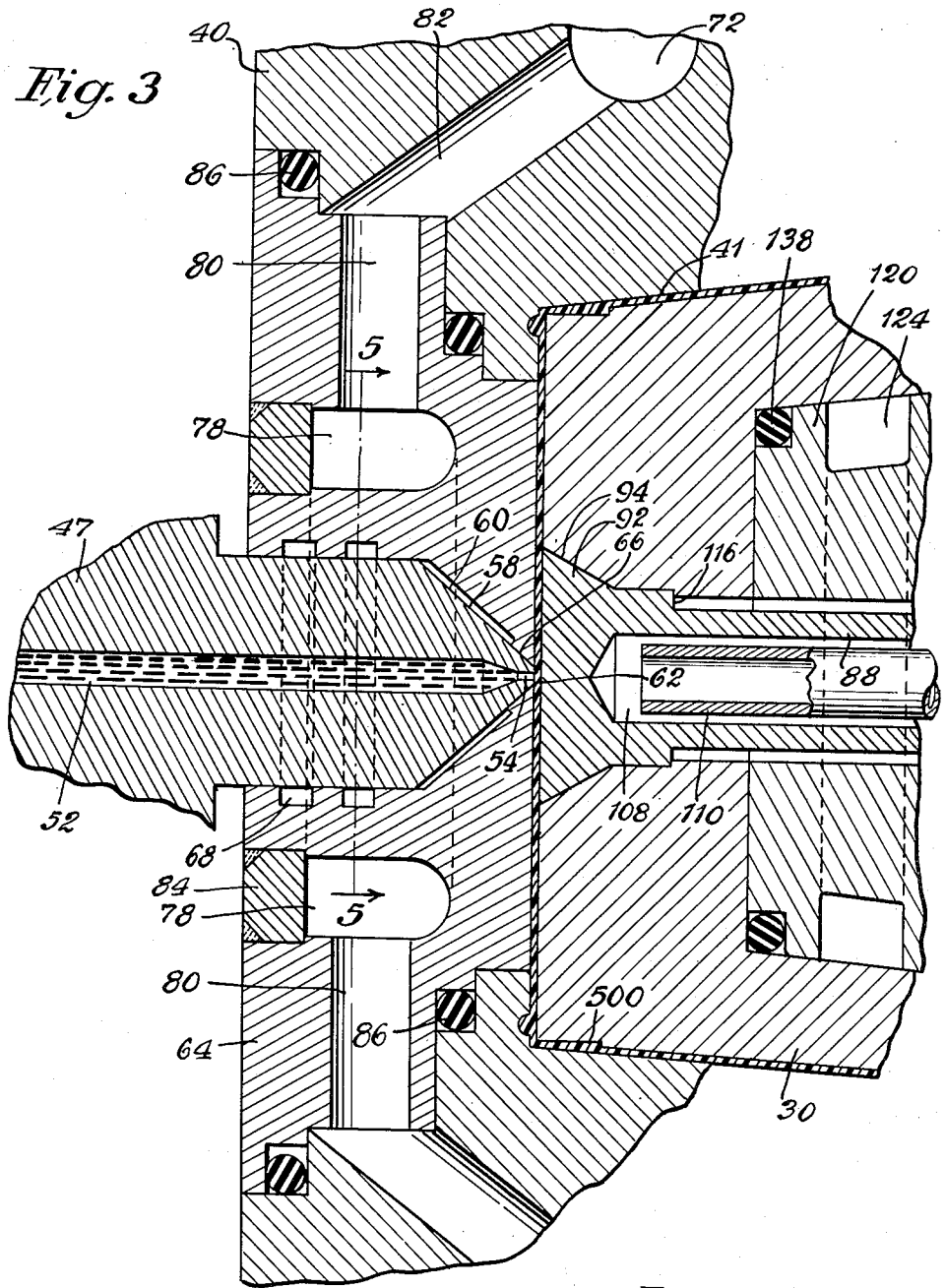
Figure 3 is an enlarged sectional view of the injection nozzle shown in Figure 2.
Figure 4:
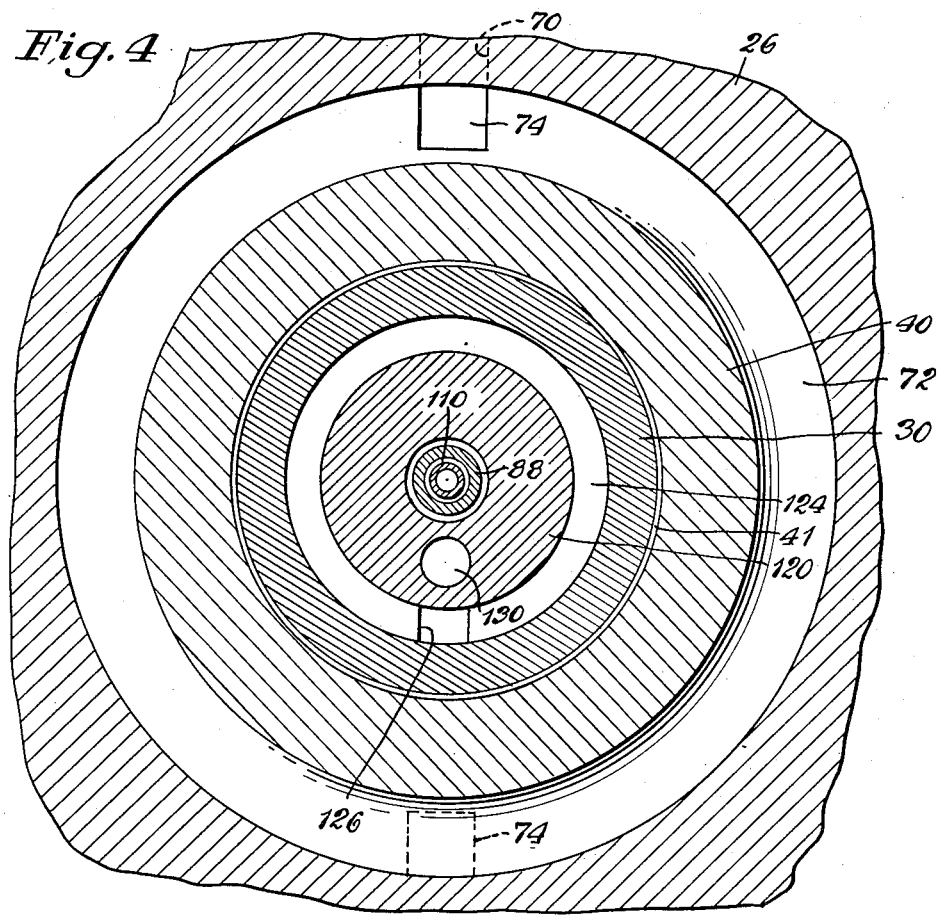
Figure 4 is a sectional view taken along line 4—4 of Figure 2.
Figure 5:
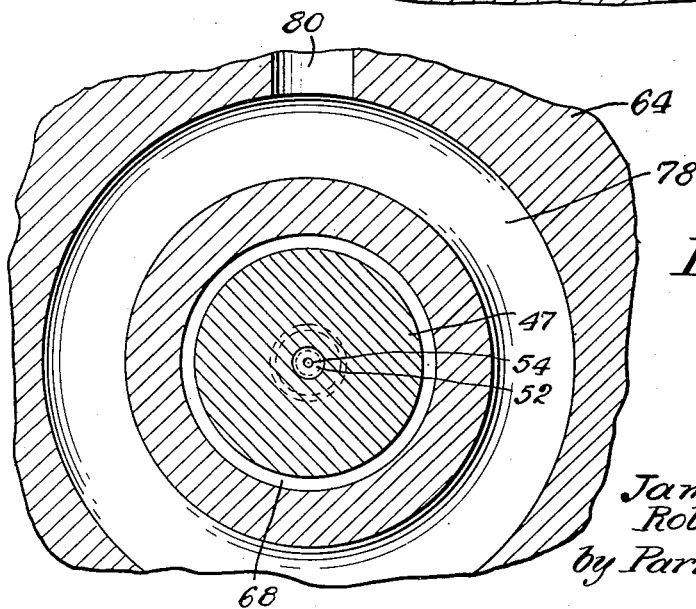
Figure 5 is a sectional view taken along line 5—5 of Figure 3.

In Figure 2 cavity platen 26 is shown with a replaceable cavity insert 40 which has the molding cavity 32. The insert is held in place by a ring 42 with a plurality of bolts 43 or other suitable securing means. The insert abuts two shoulders 44 in the cavity platen and is provided with O ring seals 45. The movable platen has been moved forward until the core 30 is inserted in the mold with slight clearance between the core and the cavity wall. It should be noted that these parts define a cavity 41 in the form of a thin wall cup-shaped member fitted around the core. The end of the core has a ring groove 500 to provide a shoulder near the inner bottom of the molded cup, and the cavity is grooved at 502 to provide an outer flange around the rim of the molded cup. As the side wall of the cavity forms an angle of generally five degrees with the bottom, the inner shoulder and outer flange should be disposed at angles so that the molded cup will come out of the cavity platen with the core and can be stripped off of the core by the rods 90. For this reason, the shoulder should be at an angle of less than 180 degrees to the side wall while the flange or rim should be at an angle of less than eight degrees to the side wall.

The injection cylinder housing 408 supports an extension member 148 into which the injection nozzle 47 is threaded, this assembly providing a passage 50 and 52 directly into the molding cavity 41 from the injection cylinder. The passage 52 in the nozzle is reduced in cross section and tapers to a pinhole 54, through which the plastic material is injected. It should be noted that the nozzle support 148 has suitable band heaters 56 around it and the nozzle 47 is spaced from the cavity insert bushing 64 at 58, except for a critical contact area, so that the heat in the nozzle will be dissipated at exactly the right rate. The nozzle projects through the anchor platen and tapers down at 60 to a tip area 62. The cavity insert carries a nozzle bushing 64 which has a tapered opening to receive the nozzle. The opening is such that the side of the nozzle will be piloted by the opening to bring the end of the nozzle accurately into a seat 66 formed in the bushing when they are moved relative to each other. Grooves 68 may be formed in either the bushing or nozzle to reduce the contact area.

The cavity insert 40 has a water coursing to cool the area around the cavity including an inlet channel 70 leading to a plurality of annular grooves or channels 72 formed in the cavity insert, the grooves being interconnected by staggered slots or passages 74 with an outlet 76 leading away from the last groove. The O-rings 45 seal both sides of the water coursing in the insert and prevent leakage.

The nozzle bushing is also water coursed by an annular channel 78 which communicates with the water course in the insert by suitable passage 80 in the bushing and channels 82 in the insert. The channel 78 is closed by a welded ring 84 and the bushing is sealed on both sides of the coursing by O-ring seals 86 or the like.

The movable platen 28 which carries the core also carries a stripper mechanism which includes an air valve mechanism 88 and a plurality of stripper rods 90. The air valve passes through the core, as shown in Figure 2, and has a valve head 92 opposed to a valve seat 94 in the core. The valve structure abuts a stripper plate 96 and a stripper backup plate 98. The valve is threaded into a supporting block 100 as at 102, the block being biased away from a backup plate 104 by a coil spring 106. The valve has a central channel 108 terminating in the valve head and a pipe 110 is positioned in the channel and spaced from the sides. A water inlet connection 112 communicates with the channel 108 so that fluid will flow between the sides of the channel and the pipe and will return through the pipe to an outlet connection 114.

The air valve is reduced in cross section through a substantial portion of its length as at 116, to provide a passage for air from an air inlet 118 in the backup plate 104.

The core is also water coursed and has a tapered insert 120 which is threaded into the core at 122. The surface of the tapered insert has annular grooves or channels 124 connected by staggered slots or passages 126, the smallest groove communicating with a water inlet 128 through a center passage 130 and the largest groove communicating with a water outlet 132 through a center passage 134. The center passages must be drilled and are closed by suitable plugs 136. O-ring seals 138 are positioned on each side of the water course to prevent leakage.

A cut-off valve 140 may be used to prevent plastic from dribbling out of the nozzle between injection shots and hydraulic breakaway cylinders 142 are mounted on the anchor platen with their piston rods connected to brackets 144 on the cavity platen so that the cavity platen will be biased away from the anchor platen at all times. A stop mechanism to limit the movement of the cavity platen includes studs 146 which are threaded into the cavity platen with stop nuts 148 on the other end, the rods passing through passages in the anchor platen.

The use, operation and function of our invention are as follows:

This molding mechanism is primarily constructed to form thin-walled articles. By thin-walled, we refer to wall thicknesses of approximately .015" to .022". To mold an item with wall thicknesses in this range requires that the plastic be extremely molten and very fluent so that the material will penetrate all sections of the thin-walled cavity before solidification begins. If this does not take place, stress lines, weakened sections, and incomplete plastic formations will develop. It is also desirable that the plastic material be injected as quickly as possible and that the entire injection stroke take place in two or three tenths of a second.

Conventional mechanisms for molding plastic articles generally include a conventional injection cylinder with various sprues and runners between the injection nozzle and the cavity. The sprues and runners generally are connected by right angle turns which offer an appreciable amount of resistance to the flow of the material. Generally the material passage includes a main sprue 5" or 6" long leading from the injection nozzle to a junction with a series of runners leading away to the individual cavities. This type of plastic passage formation imposes a great deal of frictional resistance to the flow of the plastic material.

By this invention, this tortuous path is completely eliminated and the nozzle projects directly to the molding cavity. The forward tip of the nozzle in effect forms a part of or closes the cavity and the flow of plastic material is confronted with a minimum of resistance. Much less pressure is required to inject the material into the cavity and the various power units for injecting the material can be reduced in size. All of the plastic that leaves the nozzle is injected into the cavity and no material is lost or required to be recovered after degating. No plastic is lost in the form of sprues and runners when the material is injected. All of the material is retained in the injection system except that required to fill the cavity.

In addition, the cavity is disposed directly next to the anchor platen. Thus the length of the plastic passage leading to the cavity is shortened by several inches.

The movable platen 28 with the core 30 is moved back and forth in Figure 1 by any suitable actuating mechanism and the unit can be timed and controlled by any appropriate electrical circuit. Suffice it to say that the movable platen 28 moves to the left inserting the core in the cavity at the beginning of a cycle. The anchor platen 24 is stationary while the cavity platen is slideably mounted on the rods 412. The breakaway cylinders 142 break the cavity platen away from the anchor platen disengaging the nozzle tip from its seat in the nozzle bushing, and the stops 146 allow a limited travel to the cavity platen, in the nature of $\frac{1}{16}$" to $\frac{1}{8}$". The breakaway cylinders are merely hydraulic cylinders mounted on the anchor platen and supplied from a source of relatively constant pressure hydraulic fluid to bias the cavity platen away from the anchor platen. This breakaway pressure is easily overcome by the movable platen which picks up the cavity platen and forces the nozzle seat in the bushing against the nozzle tip, closing the cavity. The separation between the nozzle tip and the bushing can be adjusted by the nuts 148.

By appropriate actuating mechanism the liquid plastic is injected into the cavity and after a short delay period during which the material is cooling as heat is extracted by the water coursing, the movable platen returns to the Figure 1 position. The cut-off valve 140 is opened at the beginning of the injection stroke and closed at the end. During the first $\frac{1}{16}$ to $\frac{1}{8}$ of an inch of movement of the movable platen, the breakaway cylinders force the cavity platen to follow it; however, this movement is limited by the studs 146. The molded part is carried by the core until the stripper mechanism operates generally in the position of Figure 1. At the same time that the stripper rods 90 apply pressure to the edge of the cup-like molded article, the air valve also unseats and air through the passage 118 is supplied to the inside of the cup-like article breaking the vacuum between the cup and the core.

By this arrangement, the molded article is automatically degated. As the tip of the nozzle is an actual part of the cavity, when the cavity platen is broken away from the nozzle, the article has no leftover flashes or gates. When the article is stripped off of the core by the rods 90, it falls on a trip pan or the like which triggers the next cycle.

We have found that a hot spot may develop in the center of the bottom of the cup-like article adjacent the nozzle tip. This portion of the molded article will not be cooled adequately. When the movable platen starts its return movement to open the mold followed by the cavity platen during its $\frac{1}{16}$" breakaway, the material in the bottom of the cup will adhere to the nozzle tip, and the bottom will be torn out of the article rendering it useless. We have found that the water coursing in the air valve will cool this center hot spot, and the plastic in the cavity in contact with the tip of the nozzle will be cool before the movable platen breaks the mold open.

The nozzle is heated by the strip heaters 56 to keep the plastic material in the nozzle from freezing. If the material freezes in the passage 52, before injection, the unit will be clogged and blocked. At the same time the pinhole 54 must freeze after a shot of plastic has been forced into the cavity so that the article will be automatically degated. When the tip of the nozzle engages the seat 66, heat will flow from the heated nozzle into the chilled bushing. The spacing 58 is provided to reduce the amount of heat transfer to prevent the pinhole 54 from freezing too soon. The slots 68 also retard the heat transfer. It is very important that the tip of the nozzle be out of metallic contact with the chilled bushing as soon as the cooling period has expired and the movable platen starts its return movement so that the entire nozzle will not be drained of its heat content due to an overly long contact with the chilled bushing.

When the nozzle is out of contact with the bushing, the heat from the strip heaters 56 will maintain the material in the passages 50 and 52 liquid and will melt the plastic in the pinhole 54 before the bushing is again forced into contact with the nozzle tip on the next cycle.

The nozzle is piloted to the seat 66 through its engagement with the bushing and any misalignment between the injection assembly and the clamping assembly will be compensated for by these pilot surfaces.

The cut off valves 140 can be actuated by any suitable mechanism in the control circuit to block the passage 50 from the injection cylinder between shots of plastic.

The tip area of the nozzle should be as small as possible to reduce the marred spot on the bottom of the molded article to a minimum. The tip has a diameter of .062" while the axis of the nozzle forms an angle of approximately 40 degrees with the nozzle seat. The pinhole opening through the nozzle has a diameter of .020".

It will be realized that whereas we have described and illustrated a practical and operative device, nevertheless, many changes may be made in the size, shape, number and disposition of parts without departing from the spirit of the invention. We, therefore, wish the description and drawings to be taken as in a broad sense illustrative or diagrammatic, rather than as limiting us to the precise showing.

We claim:

1. In a molding machine for molding relatively thin walled cup-shaped plastic articles and the like, a frame, a cavity platen on the frame, a cavity insert in the cavity platen having a cavity, a core platen on the frame with a core element insertable into the cavity to define a relatively thin walled cup-shaped molding cavity, an injection nozzle on the frame in communication with the molding cavity for supplying liquid plastic under pressure to the molding cavity, and a coolant course for the molding cavity for circulating a coolant including a plurality of separate closed channels between the cavity platen and cavity insert around the molding cavity interconnected by staggered axial passages, the channels being relatively closely spaced to the molding cavity so that heat in the plastic injected into the molding cavity may be rapidly withdrawn by the coolant flowing through the channels, an inlet communicating with one such closed channel at one end of the plurality, and an outlet communicating with another such closed channel at the other end for circulation of the coolant.

2. The structure of claim 1 further characterized in that the separate closed channels are generally annular and are formed in the cavity insert, the inlet for the coolant communicating with the closed channel of the plurality adjacent the closed end of the molding cavity, the outlet for the coolant communicating with the closed channel of the plurality adjacent the open end of the molding cavity.

3. In a molding machine for molding relatively thin walled cup-shaped plastic articles and the like, a frame, a cavity platen on the frame having a cavity, an injection nozzle in communication with the cavity for supplying hot liquid plastic under pressure to the cavity, a core platen on the frame having a core generally opposed to and insertable into the cavity to define a relatively thin walled cup-shaped molding cavity, the core having a centrally disposed insert, and means for cooling the core, including a plurality of separate closed channels for circulating a coolant between the insert and the core interconnected by staggered axial passages, the channels being relatively closely spaced to the molding cavity so that heat in the plastic injected into the molding cavity may be rapidly withdrawn by the coolant flowing through the channels, an inlet for supplying a cooling fluid to one such closed channel at one end of the plurality, and an outlet for exhausting cooling fluid from another such closed channel at the other end of the plurality for circulating the coolant.

4. The structure of claim 3 further characterized in that the inlet for the coolant communicates with the closed channel adjacent the outer end of the core, and the outlet for the coolant communicates with the closed channel adjacent the inner end of the core, the separate closed channels being generally annular and formed in the centrally disposed insert.

5. In a molding machine for molding relatively thin walled cup-shaped plastic articles and the like, a frame, a cavity platen on the frame having a cavity, a core platen on the frame with a core element insertable into the cavity to define a cup-shaped molding cavity, an injection nozzle on the frame in communication with the molding cavity for supplying liquid plastic under pressure to the molding cavity, and a coolant course for the molding cavity for circulating a coolant, including a plurality of separate closed channels in the core platen around the molding cavity interconnected by staggered axial passages, a second plurality of separate closed channels in the core element within the molding cavity and interconnected by staggered axial passages, the closed channels being relatively closely spaced to the molding cavity, both inside and outside, so that heat in the plastic injected into the molding cavity may be rapidly withdrawn by the coolant flowing through the channels, an inlet communicating with one such closed channel at one end for each plurality, and an outlet communicating with another such closed channel at the other end for each plurality for circulation of the coolant.

References Cited in the file of this patent

UNITED STATES PATENTS

| | | |
|---|---|---|
| 780,856 | Breitschwerth | Jan. 24, 1905 |
| 2,259,781 | Shaw et al. | Oct. 21, 1941 |
| 2,296,296 | Shaw | Sept. 22, 1942 |
| 2,309,729 | Gordon | Feb. 2, 1943 |
| 2,377,393 | Wiley | June 5, 1945 |
| 2,396,406 | Anderson | Mar. 12, 1946 |
| 2,519,255 | Knowles | Aug. 15, 1950 |
| 2,617,152 | Rubin | Nov. 11, 1952 |